United States Patent
Zha et al.

(10) Patent No.: US 10,022,667 B2
(45) Date of Patent: Jul. 17, 2018

(54) SYSTEMS AND METHODS FOR INCREASING NITROGEN DIOXIDE FRACTION IN EXHAUST GAS AT LOW TEMPERATURE

(71) Applicant: Cummins Inc., Columbus, IN (US)

(72) Inventors: Yuhui Zha, Columbus, IN (US); John K Heichelbech, Columbus, IN (US); Michael J. Cunningham, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/663,457

(22) Filed: Jul. 28, 2017

(65) Prior Publication Data

US 2018/0028966 A1   Feb. 1, 2018

Related U.S. Application Data

(60) Provisional application No. 62/368,470, filed on Jul. 29, 2016.

(51) Int. Cl.
| | |
|---|---|
| *F02M 26/04* | (2016.01) |
| *F01N 3/20* | (2006.01) |
| *B01D 53/94* | (2006.01) |
| *B01D 53/56* | (2006.01) |
| *B01J 23/42* | (2006.01) |
| *B01J 23/44* | (2006.01) |

(52) U.S. Cl.
CPC ............ *B01D 53/565* (2013.01); *B01J 23/42* (2013.01); *B01J 23/44* (2013.01); *F01N 3/20* (2013.01); *F02M 26/04* (2016.02)

(58) Field of Classification Search
CPC ................ B01D 53/565; B01D 53/944; B01D 53/9418; B01D 2258/01; B01D 2258/012; F01N 3/20; F01N 3/103; F01N 3/2066; F01N 2550/10; F02M 26/04
See application file for complete search history.

(56) References Cited

U.S. PATENT DOCUMENTS

| | | |
|---|---|---|
| 8,096,125 B2 | 1/2012 | Hepburn et al. |
| 8,250,866 B2 | 8/2012 | Styles et al. |
| 8,636,970 B2 * | 1/2014 | Osumi ................ F01N 13/0093 423/213.2 |
| 8,984,867 B2 | 3/2015 | Anilovich et al. |
| 9,003,781 B2 | 4/2015 | Murphy |
| 2011/0113774 A1 | 5/2011 | Nunn et al. |

(Continued)

FOREIGN PATENT DOCUMENTS

| | | | | |
|---|---|---|---|---|
| CN | 104564263 A | * | 4/2015 | ........... F01N 3/0814 |
| DE | 10 2010 002 606 | | 9/2011 | |

(Continued)

*Primary Examiner* — Timothy C Vanoy
(74) *Attorney, Agent, or Firm* — Foley & Lardner LLP

(57) ABSTRACT

An aftertreatment system includes a first oxidation catalyst, a second oxidation catalyst, and a turbocharger. The first oxidation catalyst is upstream of the turbocharger and includes a first oxidation catalyst formulation. The second oxidation catalyst is downstream of the turbocharger and includes a second oxidation catalyst formulation different than the first oxidation catalyst formulation. The second oxidation catalyst formulation is configured to promote conversion of nitric oxide (NO) to nitrogen dioxide ($NO_2$).

20 Claims, 7 Drawing Sheets

(56) References Cited

U.S. PATENT DOCUMENTS

| | | | |
|---|---|---|---|
| 2012/0315204 A1* | 12/2012 | Osumi | B01D 53/9477 |
| | | | 423/213.7 |
| 2014/0090374 A1 | 4/2014 | Chavannavar | |
| 2014/0260215 A1* | 9/2014 | Cook | F01N 3/20 |
| | | | 60/299 |
| 2016/0230629 A1* | 8/2016 | Davies | F01N 3/10 |

FOREIGN PATENT DOCUMENTS

| | | | | |
|---|---|---|---|---|
| EP | 2676016 B1 | * | 10/2015 | F01N 3/035 |
| GB | 2 462 798 | | 2/2010 | |
| JP | 2005-188395 | * | 7/2005 | F01N 3/0807 |
| JP | 2013241859 A | * | 12/2013 | F01N 3/08 |

* cited by examiner

SYSTEMS AND METHODS FOR INCREASING NITROGEN DIOXIDE FRACTION IN EXHAUST GAS AT LOW TEMPERATURE

CROSS-REFERENCE TO RELATED PATENT APPLICATIONS

This application claims the benefit of priority from U.S. Provisional Application Ser. No. 62/368,470, filed Jul. 29, 2016 and the contents of which are incorporated herein by reference in its entirety.

STATEMENT REGARDING FEDERALLY SPONSORED RESEARCH

This invention was made with Government support under DE-EE0006795 awarded by the United States Department of Energy. The Government has certain rights in this invention.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems include any of several different components to reduce the levels of harmful exhaust emissions present in exhaust gas. For example, certain exhaust gas aftertreatment systems for diesel-powered IC engines include a selective catalytic reduction (SCR) system, including a catalyst formulated to convert nitrogen oxide ($NO_x$) gases (nitric oxide (NO) and nitrogen dioxide ($NO_2$) in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as urea) is injected into the SCR system to provide a source of $NH_3$ and is mixed with the exhaust gas to partially reduce the $NO_x$ gases. The reduction byproducts of the exhaust gas are then fluidically communicated to the catalyst included in the SCR system to decompose substantially all of the $NO_x$ gases into relatively harmless byproducts that are expelled out of the aftertreatment system.

SCR systems generally demonstrate a low $NO_x$ conversion efficiency (e.g., less than 90% $NO_x$ conversion efficiency) when the exhaust gas passing through the SCR system is at a relatively low temperature (e.g., less than 200 degrees Celsius). For example, when an engine is cold started, it may take significant time before the temperature rises enough that the SCR system is able to provide a high $NO_x$ conversion efficiency. Furthermore, the exhaust gas may cool as it expands in a turbocharger, so it may not achieve or maintain a temperature sufficient to achieve or maintain a high $NO_x$ conversion efficiency.

SUMMARY

Embodiments described herein relate generally to systems and methods for increasing an $NO_2$ fraction in an exhaust gas at low temperatures so as to increase a $NO_x$ conversion efficiency of an SCR system. Various embodiments of the systems and methods described herein include an oxidation catalyst positioned downstream of a turbocharger and upstream of an SCR system. The first oxidation catalyst is configured to promote conversion of NO in the exhaust gas to $NO_2$ at low exhaust gas temperatures so as to increase a ratio of $NO_2$ to $NO_x$ gases in the exhaust gas.

In one or more embodiments, an aftertreatment system includes a first oxidation catalyst, a second oxidation catalyst, and a turbocharger. The first oxidation catalyst is upstream of the turbocharger and includes a first oxidation catalyst formulation. The second oxidation catalyst is downstream of the turbocharger and includes a second oxidation catalyst formulation different than the first oxidation catalyst formulation. The second oxidation catalyst formulation is configured to promote conversion of NO to $NO_2$.

In one or more embodiments, an aftertreatment system includes an SCR system, a first oxidation catalyst, and a second oxidation catalyst. The SCR system is configured to decompose constituents of an exhaust gas produced by an engine. The first oxidation catalyst is upstream of a turbocharger and includes a first oxidation catalyst formulation. The second oxidation catalyst is downstream of the turbocharger and upstream of the SCR system. The second oxidation catalyst includes a second oxidation catalyst formulation different than the first oxidation catalyst formulation. The second catalyst formulation is configured to promote conversion of NO included in the exhaust gas to $NO_2$.

In one or more embodiments, a method includes positioning a first oxidation catalyst in an exhaust aftertreatment system upstream of a turbocharger. The first oxidation catalyst includes a first oxidation catalyst formulation. A second oxidation catalyst is positioned in the exhaust aftertreatment system downstream of the turbocharger. The second oxidation catalyst includes a second oxidation catalyst formulation different than the first oxidation catalyst formulation. The second oxidation catalyst formulation is configured to promote conversion of NO to $NO_2$. The method further comprises flowing exhaust gas through the first oxidation catalyst and the second oxidation catalyst.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
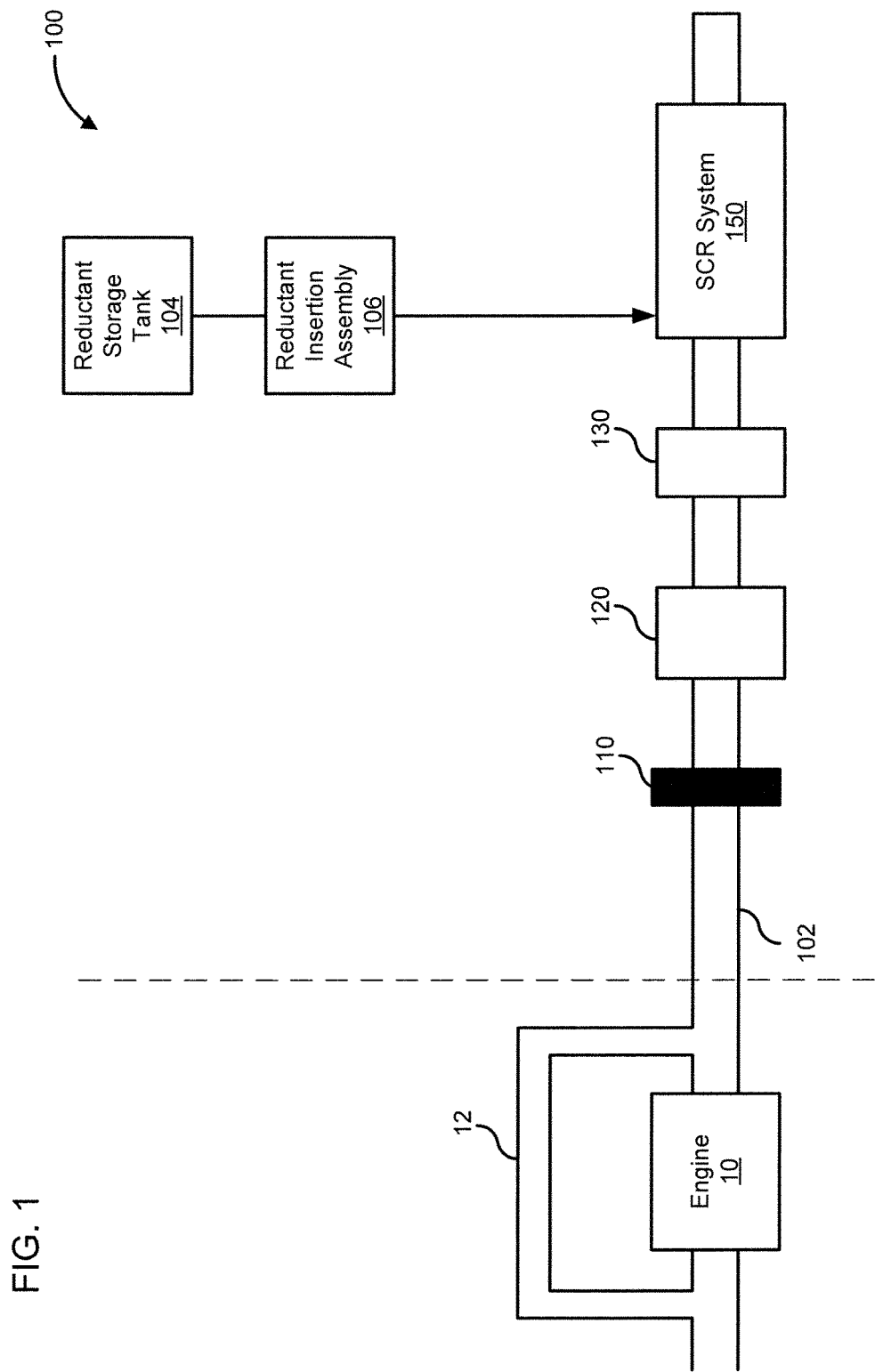
FIG. 1 is an illustration of an aftertreatment system fluidly coupled to an engine, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for increasing a $NO_2$ fraction in an exhaust gas at low temperatures so as to increase a $NO_x$ conversion efficiency of an SCR system. Various embodiments of the systems and methods described herein include an oxidation catalyst positioned downstream of a turbocharger and upstream of an SCR system, to promote conversion of NO in the exhaust gas to $NO_2$ at low exhaust gas temperatures so as to increase a ratio of $NO_2$ to $NO_x$ gases in the exhaust gas.

An SCR system may be able to provide high $NO_x$ conversion efficiency at low exhaust gas temperature if a ratio of $NO_2$ to $NO_x$ gases included in the exhaust gas is optimized to about 0.5, such as, for example, in a range of about 0.4 to about 0.6, or about 0.45 to about 0.50, or about 0.48 to about 0.52. However, such an $NO_2$ to $NO_x$ ratio is not naturally generated at low exhaust gas temperatures.

Equations 1-3 represent some chemical reactions which may occur in an SCR System as $NO_x$ gases encounter a catalyst or catalysts in the SCR or $NH_3$ injected into the exhaust. SCR systems may decompose $NO_x$ gases included in the exhaust gas through the following reactions:

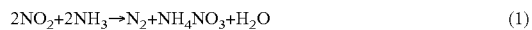

$$2NO_2+2NH_3 \rightarrow N_2+NH_4NO_3+H_2O \quad (1)$$

$$NO+NH_4NO_3 \rightarrow NO_2+N_2+2H_2O \quad (2)$$

$$NO+NO_2+2NH_3 \rightarrow 2N+3H_2O \quad (3)$$

The reaction in equation 1 and 2 illustrate a formation (equation 1) and breakdown (equation 2) of ammonia nitrate ($NH_4NO_3$). Formation of $NH_4NO_3$ may be undesirable, and is more likely to occur at low temperatures (e.g., less than 200 degrees Celsius). The reaction in equation 3 is a fast reaction (e.g., faster than the reactions in equations 1 and 2), and the reaction in equation 3 may minimize $NH_4NO_3$ produced by the reaction in equation 1, by converting $NH_3$ present in the exhaust gas by way of the reaction in equation 3 before the $NH_3$ can be converted into $NH_4NO_3$ by the reaction in equation 1. As can be seen in equation 3, in the theoretic case, a one-to-one ratio of NO to $NO_2$ in an amount sufficient to exactly balance the $NH_3$ in the exhaust would result in the production of $N_2$ and $H_2O$, which are presently considered acceptable by-products of the catalytic conversion.

In an actual exhaust gas environment, quantities of NO and $NH_3$ are generally unknown to an exact amount at any given moment. In the event that excess $NO_2$ exists such that the $NO_2$ exceeds the NO, $N_2O$ (an undesirable by-product) may be formed through reactions such as shown in equations 4 and 5:

$$8NO_2+6NH_3 \rightarrow 7N_2O+9H_2O \quad (4)$$

$$4NO_2+4NH_3+O_2 \rightarrow 4N_2O+6H_2O \quad (5)$$

Accordingly, $NO_2$ is controlled in embodiments of the present disclosure to maintain a ratio of $NO_2$ to $NO_x$ at approximately 0.5, as discussed above.

To improve low temperature (e.g., less than 200 degrees Celsius) $NO_x$ conversion efficiency of SCR systems via the reactions 1 and 2, the exhaust gas may be enriched with $NO_2$ to bring the ratio of $NO_2$ to $NO_x$ to 0.5 or higher.

In one or more embodiments of the present disclosure, thermal management of exhaust gas passing through the aftertreatment system is controlled via insertion of hydrocarbons (HCs) (e.g., fuel, such as diesel) on an oxidation catalyst included in the aftertreatment system. Upon injection, the HCs combust in the oxidation catalyst, which increases the temperature of the exhaust gas, thereby promoting conversion of NO to $NO_2$. In one or more embodiments, a temperature of the oxidation catalyst may be raised by heating the oxidation catalyst using a separate heater operatively coupled to the oxidation catalyst (e.g., an electric heater). Both these approaches, however, may reduce fuel economy.

In one or more embodiments, an amount of exhaust gas recirculated to the engine (e.g., via an exhaust gas recirculation (EGR) system), is increased so as to increase the $NO_2$ fraction included in the exhaust gas. However, EGR may also cause an increase in a concentration of HCs included in the exhaust gas, which may inhibit the NO to $NO_2$ conversion reaction. Furthermore, since oxidation catalysts may also be positioned upstream of the SCR system, oxidation of unburnt HCs of the exhaust gas over the oxidation catalyst may consume $NO_2$ included in the exhaust gas produced by the engine, as well as limit $NO_x$ oxidation efficiency. Even when very little or no exhaust gas is recirculated, unburnt HCs from the engine may also inhibit performance of an $NO_2$ generating oxidation catalyst.

The techniques described in the present disclosure provide for further improvements in $NO_x$ conversion. Various embodiments of the systems and methods described herein may provide benefits including, for example, one of, or a combination of: (1) increasing an $NO_2$ fraction in the exhaust gas at low exhaust gas temperatures (e.g., below 200 degrees Celsius) by positioning an $NO_2$ generating oxidation catalyst upstream of an SCR system to allow the SCR system to provide a high $NO_x$ conversion efficiency of greater than 90% even at the low exhaust gas temperature; (2) minimizing impact of unburnt HCs on the NO to $NO_2$ conversion reaction by positioning a hydrocarbon oxidation catalyst upstream of the $NO_2$ generating oxidation catalyst; (3) minimizing space consumption by positioning the hydrocarbon oxidation catalyst downstream of the engine and upstream of the turbocharger; (4) providing an increase of $NO_2$ in the exhaust gas at normal engine operating conditions or high EGR conditions by positioning the $NO_2$ generating oxidation catalyst between a turbocharger and the SCR system; and (5) minimizing thermal aging of the hydrocarbon oxidation catalyst by positioning the hydrocarbon oxidation catalyst in a bypass line upstream of the turbocharger, which may be selectively closed when the exhaust gas temperature exceeds a predetermined temperature threshold.

FIG. 1 is an illustration of an aftertreatment system 100, according to an embodiment. The aftertreatment system 100 is configured to receive an exhaust gas (e.g., a diesel exhaust gas) from an engine 10 (e.g., a diesel engine, a dual fuel engine, etc.) and reduce constituents of the exhaust gas such as, for example, $NO_x$ gases, carbon monoxide (CO), and HCs. The aftertreatment system 100 may include a reductant storage tank 104, a reductant insertion assembly 106, an SCR system 150, a first oxidation catalyst 110, a second oxidation catalyst 130 and optionally, a turbocharger 120. It is to be understood that the aftertreatment system 100 may include additional components, such as a diesel particulate filter (DPF), which may be positioned between the second oxidation catalyst 130 and the SCR system 150. In one or more embodiments, the aftertreatment system 100 may be included in an engine system that includes the engine 10, and may optionally include an EGR line 12, as described herein.

The engine 10 may include an IC engine operable on a fossil fuel or biofuel, such as diesel, gasoline, natural gas, dual fuel or any other suitable fuel. The engine 10 consumes the fuel (e.g., diesel) and generates an exhaust gas. The exhaust gas may contain $NO_x$ gases (e.g., NO and $NO_2$), CO, unburnt HCs, particulate matter and/or other gases. The engine 10 is fluidly coupled to the aftertreatment system via an exhaust conduit 102. The exhaust conduit 102 is configured to communicate the exhaust gas from the engine 10.

In one or more embodiments, an EGR line 12 may be fluidly coupled to the exhaust conduit 102 downstream of the engine 10, and configured to recirculate a portion of the exhaust gas to the engine 10 (e.g., to an intake conduit providing intake air to the engine 10). The recirculated portion of the exhaust gas may dilute the oxygen in an inlet air provided to the engine 10, resulting in production of gases inert to combustion. These gases may act as absorbents of combustion heat to reduce peak in-cylinder temperatures of the engine 10, such as to reduce engine exhaust $NO_x$ levels. In one or more embodiments, an EGR valve (not shown) may be positioned in the EGR line 12, and configured to adjust an amount of the exhaust gas recirculated back to the engine 10.

The SCR system 150 is configured to decompose constituents of an exhaust gas flow therethrough. In one or more embodiments, the SCR system 150 may include a housing defining an internal volume within which a catalyst is positioned. The housing may be formed from a rigid, heat-resistant and corrosion-resistant material, such as stainless steel, iron, aluminum, or other metal or combination of metals, ceramics, or any other suitable material. The housing may have any suitable cross-section, for example circular, square, rectangular, oval, elliptical, polygonal, or any other suitable shape. In one or more embodiments, the SCR system 150 may include a selective catalytic reduction on filter (SCR on filter) system, or any other aftertreatment component configured to decompose constituents of the exhaust gas (e.g., $NO_x$ gases such as such NO or $NO_2$), flowing through the aftertreatment system in the presence of a reductant, as described herein.

The SCR system 150 may include a catalyst formulated to decompose constituents of the exhaust gas, such as $NO_x$ gases flowing through the aftertreatment system 100. A reductant insertion port may be provided on a sidewall of the housing of the SCR system 150 and structured to allow insertion of a reductant (e.g., via injection) therethrough into the SCR system 150. The reductant insertion port may be positioned upstream of the catalyst (e.g., to allow reductant to be inserted into the exhaust gas upstream of the catalyst) or over the catalyst (e.g., to allow reductant to be inserted directly onto the catalyst) of the SCR system 150.

The catalyst of the SCR system is formulated to selectively decompose constituents of the exhaust gas (e.g., $NO_x$ gases included in the exhaust gas). Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalyst. Such washcoat materials may include, for example, aluminum oxide, titanium dioxide, silicon dioxide, any other suitable washcoat material, or a combination thereof. The exhaust gas (e.g., diesel exhaust gas) can flow over and/or about the catalyst such that any $NO_x$ gases included in the exhaust gas are further reduced to yield an exhaust gas that is substantially free of $NO_x$ gases.

The reductant storage tank 104 is structured to store a reductant. The reductant is formulated to facilitate decomposition of the constituents of the exhaust gas (e.g., $NO_x$ gases included in the exhaust gas). Any suitable reductant can be used. In one or more embodiments, the exhaust gas includes a diesel exhaust gas and the reductant includes a diesel exhaust fluid. For example, the diesel exhaust fluid may include urea, an aqueous solution of urea, or any other fluid that includes $NH_3$, by-products, or any other diesel exhaust fluid as is known in the arts (e.g., the diesel exhaust fluid marketed under the name ADBLUE®). For example, the reductant may include an aqueous urea solution having a particular ratio of urea to $H_2O$. In particular embodiments, the reductant can include an aqueous urea solution including 32.5% by volume of urea and 67.5% by volume of deionized $H_2O$.

A reductant insertion assembly 106 may be fluidly coupled to the reductant storage tank 104. The reductant insertion assembly 106 may be configured to selectively insert the reductant into the SCR system 150 or upstream thereof (e.g., into the exhaust conduit 102) or into a mixer or decomposition tube (not shown) positioned upstream of the SCR system 150. The reductant insertion assembly 106 may include various structures to facilitate receipt of the reductant from the reductant storage tank 104 and delivery to the SCR system 150.

For example, the reductant insertion assembly 106 may include one or more pumps having filter screens (e.g., to prevent solid particles of the reductant or contaminants from flowing into the pump) and/or valves (e.g., check valves) positioned upstream thereof to receive reductant from the reductant storage tank 104. In one or more embodiments, the pump may include a diaphragm pump but any other suitable pump may be used such as, for example, a centrifugal pump, a suction pump, etc.

The pump may be configured to pressurize the reductant so as to provide the reductant to the SCR system 150 at a predetermined pressure. Screens, check valves, pulsation dampers, or other structures may also be positioned downstream of the pump to provide the reductant to the SCR system 150. In various embodiments, the reductant insertion assembly 106 may also include a bypass line structured to provide a return path of the reductant from the pump to the reductant storage tank 104.

A valve (e.g., an orifice valve) may be provided in the bypass line. The valve may be structured to allow the reductant to pass therethrough to the reductant storage tank 104 if an operating pressure of the reductant generated by the pump exceeds a predetermined pressure so as to prevent over pressurizing of the pump, the reductant delivery lines, or other components of the reductant insertion assembly 106. In one or more embodiments, the bypass line may be configured to allow the return of the reductant to the reductant storage tank 104 during purging of the reductant insertion assembly 106 (e.g., after the aftertreatment system 100 is shut off).

In various embodiments, the reductant insertion assembly 106 may also include a blending chamber structured to receive pressurized reductant from a metering valve at a controllable rate. The blending chamber may also be structured to receive air or any other inert gas (e.g., $N_2$), for example, from an air supply unit so as to deliver a combined flow of the air and the reductant to the SCR system 150 through the reductant insertion port. In various embodiments, a nozzle may be positioned in the reductant insertion port and structured to deliver a stream or a jet of the reductant into the SCR system 150.

In various embodiments, the reductant insertion assembly 106 may also include a dosing valve, for example, positioned within a reductant delivery line for delivering the reductant from the reductant insertion assembly 106 to the SCR system 150. The dosing valve may include any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve, or any other suitable valve. The dosing valve may be selectively opened to insert a predetermined quantity of the reductant for a predetermined time into the SCR system 150 or upstream therefrom.

The turbocharger 120 may be positioned within the exhaust conduit 102 or fluidly coupled to the exhaust conduit 102 via a turbocharger conduit. The turbocharger 120 is configured at receive at least a portion of the exhaust gas and may include a turbine powered by at least the portion of the exhaust gas. The turbine may be operatively coupled to a compressor of the turbocharger 120 configured to force intake air into the engine 10 so as to increase an efficiency and power output thereof.

The first oxidation catalyst 110 may be positioned downstream of the engine 10 and upstream of a turbocharger 120. For example, the first oxidation catalyst 110 may be positioned downstream of the EGR line 12, when the EGR line 12 is included in an engine system including the engine 10 and the aftertreatment system 100. The first oxidation catalyst 110 includes a first oxidation catalyst formulation. In one or more embodiments, the first oxidation catalyst formulation may be configured to promote oxidation of unburnt HCs included in the exhaust gas flowing through the aftertreatment system 100.

The first oxidation catalyst 110 may include a platinum group metal, for example platinum and/or palladium. In one or more embodiments, the first oxidation catalyst 110 may have a first loading of the platinum group metal (e.g., a first platinum group metal loading value, which may be expressed in $g/cm^3$). Furthermore, the first oxidation catalyst 110 may include a first ratio of platinum to palladium. The first loading of the platinum group metal and the first ratio of platinum to palladium in the first oxidation catalyst 110 may be configured to promote oxidation of unburnt HCs included in the exhaust gas.

The second oxidation catalyst 130 may be positioned downstream of the turbocharger 120 and upstream of the SCR system 150. The second oxidation catalyst 130 may include a second oxidation catalyst formulation different than the first oxidation catalyst formulation. Specifically, the second oxidation catalyst formulation may be configured to promote conversion of NO included in the exhaust gas to $NO_2$.

The second oxidation catalyst 130 may also include a platinum group metal (e.g., platinum and/or palladium). In one or more embodiments, the second oxidation catalyst 130 may have a second loading of the platinum group metal (e.g., a second platinum group metal loading value, which may be expressed in $g/cm^3$). Furthermore, the second oxidation catalyst 130 may include a second ratio of platinum to palladium. The second loading of the platinum group metal and the second ratio of platinum to palladium in the second oxidation catalyst 130 may, for example, be selected to promote conversion of NO included in the exhaust gas to $NO_2$.

In one or more embodiments, the first loading of the platinum group metal in the first oxidation catalyst 110 may be greater than the second loading of the platinum group metal in the second oxidation catalyst 130 (e.g., the first oxidation catalyst 110 may have a higher loading of the platinum group metal than the second oxidation catalyst 130). In one or more embodiments, the first loading of the platinum group metal may be greater than the second loading of the platinum group metal by about 10%, 20%, 30%, 40%, 50%, 100%, 200%, 300%, 400%, or 500%, inclusive of all ranges and values therebetween.

Furthermore, the first ratio of platinum to palladium in the first oxidation catalyst 110 may be smaller than the second ratio of the platinum to palladium in the second oxidation catalyst 130 (e.g., the first oxidation catalyst 110 includes a lower loading ratio of the platinum to the palladium relative to the second oxidation catalyst 130).

During operation of the aftertreatment system, the second oxidation catalyst is configured to convert NO to $NO_2$, thereby enriching the exhaust gas with $NO_2$ such that a ratio of $NO_2$ to $NO_x$ gases in the exhaust gas after passing through the second oxidation catalyst 130 is about 0.5, such as, for example, in a range of about 0.4 to about 0.6, or about 0.45 to about 0.50, or about 0.48 to about 0.52. This ratio may allow the SCR system 150 to attain a catalytic conversion efficiency of at least 90% at an exhaust gas temperature of less than 200 degrees Celsius, thereby allowing the SCR system 150 to maintain high $NO_x$ conversion efficiency even at low exhaust gas temperatures.

Further, positioning of the second oxidation catalyst 130 downstream of the turbocharger 120 and dividing catalyst volume between the first oxidation catalyst 110 and the second oxidation catalyst 130 provides several additional advantages. For example, because it may not be desirable and/or feasible to physically package the catalyst volume upstream of the turbocharger, the divided catalyst volume in the first oxidation catalyst 110 and the second oxidation catalyst 130 provides for flexibility in positioning of the catalyst volume. Additionally, because a large volume of catalyst upstream of the turbocharger may have a negative impact on a torque responsiveness of the engine, dividing catalyst volume between the first oxidation catalyst 110 and the second oxidation catalyst 130 mitigates impact on torque responsiveness. Still further, having the two different oxidation catalyst functions of the first oxidation catalyst 110 and the second oxidation catalyst 130 in two different temperature zones may optimize the NO2 to NOx ratio to about 0.5 such as, for example, in a range of about 0.4 to about 0.6, or about 0.45 to about 0.50, or about 0.48 to about 0.52.

Further, positioning of the second oxidation catalyst 130 downstream of the turbocharger 120 allows $NO_2$ to be generated downstream of the turbocharger 120 even if the exhaust gas temperature after passing through the turbocharger 120 drops below an effective $NO_x$ conversion temperature (e.g., because the ratio of $NO_2$ to $NO_x$ may be lower at the lower temperature of the exhaust gas). Thus, positioning of the second oxidation catalyst 130 downstream of the turbocharger 120 may allow the exhaust gas to have a more favorable ratio of $NO_2$ to $NO_x$ (e.g., at least 0.5) to allow the SCR system 150 to maintain a higher $NO_x$ conversion efficiency.

Additionally, positioning the first oxidation catalyst 110 downstream of the engine 10 (e.g., downstream of the EGR line 12) and upstream of the turbocharger 120 allows reduction of unburnt HCs in the exhaust gas to sufficiently low levels so as not to significantly impact a performance of the second oxidation catalyst 130 and/or the SCR system 150 (e.g., from unburnt HCs in the exhaust gas impeding the conversion of NO to $NO_2$).

The combination of the first oxidation catalyst 110 and the second oxidation catalyst 130 may allow the SCR system 150 to deliver a high $NO_x$ conversion efficiency (e.g., greater than 90%) even at low exhaust gas temperatures (e.g., less than 200 degrees Celsius).

In one or more embodiments, the first oxidation catalyst may include a zone coated catalyst configured to oxidize HCs as well as convert NO present in the exhaust gas to $NO_2$.

Figure 2:
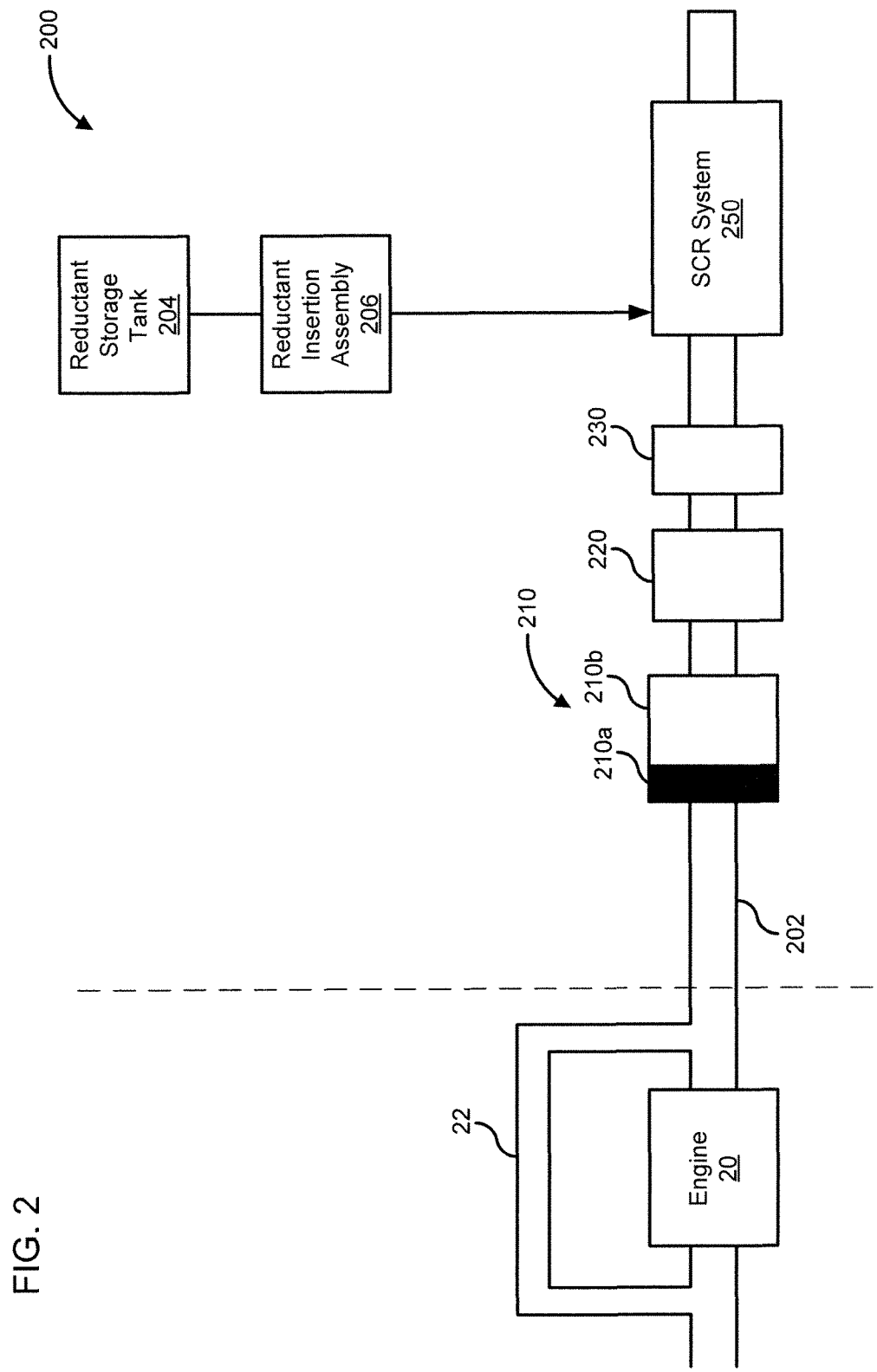
FIG. 2 is an illustration of another embodiment of an aftertreatment system.

FIG. 2 is an illustration of an aftertreatment system 200 according to an embodiment of the present disclosure in which the first oxidation catalyst includes a zone coated catalyst. The aftertreatment system 200 is fluidly coupled to an engine 20, which may be substantially similar to the engine 10 and is therefore not described in detail herein. The aftertreatment system 200 is fluidly coupled to the engine 20 via an exhaust conduit 202. An EGR line 22 may be fluidly coupled to the exhaust conduit 202 and may be configured to recirculate a portion of the exhaust gas to the engine 20, as described with respect to the EGR line 12 of FIG. 1.

The aftertreatment system 200 includes an SCR system 250. A reductant insertion assembly 206 may be operatively coupled to the SCR system 250 and configured to selectively insert a reductant into the SCR system 250 from a reductant storage tank 204. The reductant storage tank 204, the reductant insertion assembly 206, and the SCR system 250 may be substantially similar to the reductant storage tank 104, reductant insertion assembly 106, and the SCR system 150 respectively, and are therefore not described in detail herein.

An optional turbocharger 220 is positioned downstream of the engine 20 and upstream of the SCR system 250. The turbocharger 220 may be substantially similar to the turbocharger 120, and is therefore not described in detail herein.

A first oxidation catalyst 210 is positioned upstream of the turbocharger 220 and downstream of the engine 20 (e.g., downstream of an inlet of the EGR line 22). A second oxidation catalyst 230 is positioned downstream of the turbocharger 220 and upstream of the SCR system 250. The second oxidation catalyst 230 is substantially similar to the second oxidation catalyst 130 described with respect to FIG. 1, and is therefore not described in detail herein.

The first oxidation catalyst 210 includes a zone coated oxidation catalyst. The first oxidation catalyst 210 includes a first oxidation catalyst first portion 210a configured to promote oxidation of HCs included in the exhaust gas. For example, the first oxidation catalyst first portion 210a may include a first loading of the platinum group metal and a first ratio of platinum to palladium, such as, for example, similar to the loading and ratio of the first oxidation catalyst 110 as described above.

Unlike the first oxidation catalyst 110, however, the first oxidation catalyst 210 also includes a first oxidation catalyst second portion 210b positioned downstream of the first oxidation catalyst first portion 210a. The first oxidation catalyst second portion 210b may be configured to promote conversion of NO included in the exhaust gas to $NO_2$. For example, the first oxidation catalyst second portion 210b may include a second loading of the platinum group metal and a second ratio of platinum to palladium, which may be substantially similar to the loading and ratio of the second oxidation catalyst 130 as described above.

In one or more embodiments, the first oxidation catalyst first portion 210a may be longer in length and/or have higher volumetric capacity than the first oxidation catalyst second portion 210b. In other embodiments, the first oxidation catalyst first portion 210a may be shorter in length and/or have a smaller volumetric capacity than the first oxidation catalyst second portion 210b. In still other embodiments, the first oxidation catalyst first portion 210a, and the first oxidation catalyst second portion 210b may have substantially a same length and/or volumetric capacity.

Providing the zone coated first oxidation catalyst 210 upstream of the turbocharger 220 allows for oxidation of unburnt HCs as well as generation of $NO_2$, which may lead to a higher ratio of $NO_2$ to $NO_x$ gases in combination with the second oxidation catalyst 230, relative to the aftertreatment system 100.

In one or more embodiments, the second oxidation catalyst may include a zone coated oxidation catalyst configured to oxidize HCs as well as convert NO present in the exhaust gas to $NO_2$.

Figure 3:
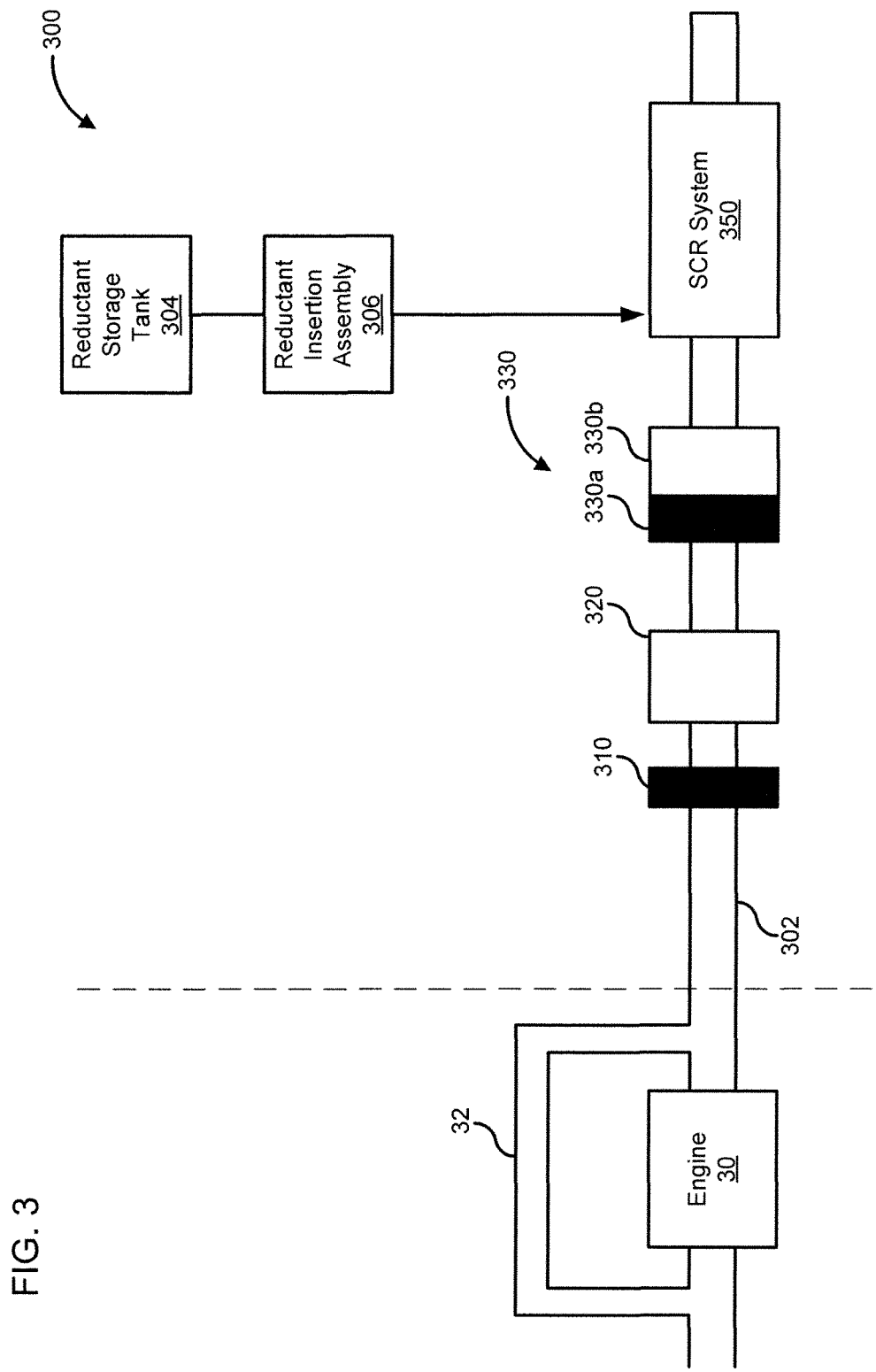
FIG. 3 is an illustration of another embodiment of an aftertreatment system.

FIG. 3 is an illustration of an aftertreatment system 300 according to an embodiment of the present disclosure. The aftertreatment system 300 is fluidly coupled to an engine 30, which may be substantially similar to the engine 10, 20 described with respect to FIGS. 2 and 3, respectively, and is therefore not described in detail herein. The aftertreatment system 300 is fluidly coupled to the engine 30 via an exhaust conduit 302. An EGR line 32 may be fluidly coupled to the exhaust conduit 302 and configured to recirculate a portion of the exhaust gas to the engine 30, as described with respect to the EGR line 12 of FIG. 1.

The aftertreatment system 300 includes an SCR system 350. A reductant insertion assembly 306 may be operatively coupled to the SCR system 350 and configured to selectively insert a reductant into the SCR system 350 from a reductant storage tank 304. The reductant storage tank 304, the reductant insertion assembly 306, and the SCR system 350 may be substantially similar to the reductant storage tank 104, 204, reductant insertion assembly 106, 206, and the SCR system 150, 250, and are therefore not described in detail herein.

An optional turbocharger 320 is positioned downstream of the engine 30 and upstream of the SCR system 350. The turbocharger 320 may be substantially similar to the turbocharger 120, 220, and is therefore not described in detail herein.

A first oxidation catalyst 310 is positioned upstream of the turbocharger 320 and downstream of the engine 30 (e.g., downstream of an inlet of the EGR line 32). The first oxidation catalyst 310 may be substantially similar to the first oxidation catalyst 110 as described with respect to the FIG. 1 and is therefore not described in detail herein.

A second oxidation catalyst 330 is positioned downstream of the turbocharger 320 and upstream of the SCR system 350. The second oxidation catalyst 330 includes a zone coated oxidation catalyst. The second oxidation catalyst 330 includes a second oxidation catalyst first portion 330a configured to promote oxidation of HCs included in the exhaust gas. For example, the second oxidation catalyst first portion 330a may include a first loading of the platinum group metal and a first ratio of platinum to palladium, which may be substantially similar to the loading and ratio of the first oxidation catalyst 110 or the first oxidation catalyst first portion 210a described above.

The second oxidation catalyst 330 also includes a second oxidation catalyst second portion 330b positioned downstream of the second oxidation catalyst first portion 330a. The second oxidation catalyst second portion 330b may be configured to promote conversion of NO included in the exhaust gas to $NO_2$. For example, the second oxidation catalyst second portion 330b may include a second loading of the platinum group metal and a second ratio of platinum to palladium, which may be similar to the loading and ratio as described with respect to the second oxidation catalyst 130 or the first oxidation catalyst second portion 210b.

In one or more embodiments, the second oxidation catalyst first portion 330a may be longer in length and/or have higher volumetric capacity than the second oxidation catalyst second portion 330b. In other embodiments, the second oxidation catalyst first portion 330a may be shorter in length and/or have a smaller volumetric capacity than the second oxidation catalyst second portion 330b. In still other embodiments, the second oxidation catalyst first portion 330a, and the second oxidation catalyst second portion 330b may have substantially a same length and/or volumetric capacity.

Providing the zone coated second oxidation catalyst 330 downstream of the turbocharger 320 allows for oxidation of unburnt HCs (which may remain in the exhaust gas after passing through the first oxidation catalyst 310) by the second oxidation catalyst first portion 330a. This may result in a higher removal rate of the unburnt HCs from the exhaust gas, thereby allowing the second oxidation catalyst second portion 330b to provide a higher conversion efficiency of NO to $NO_2$.

In one or more embodiments, a bypass line may be fluidly coupled to an exhaust conduit of the aftertreatment system, and the first oxidation catalyst may be positioned therein.

Figure 4:
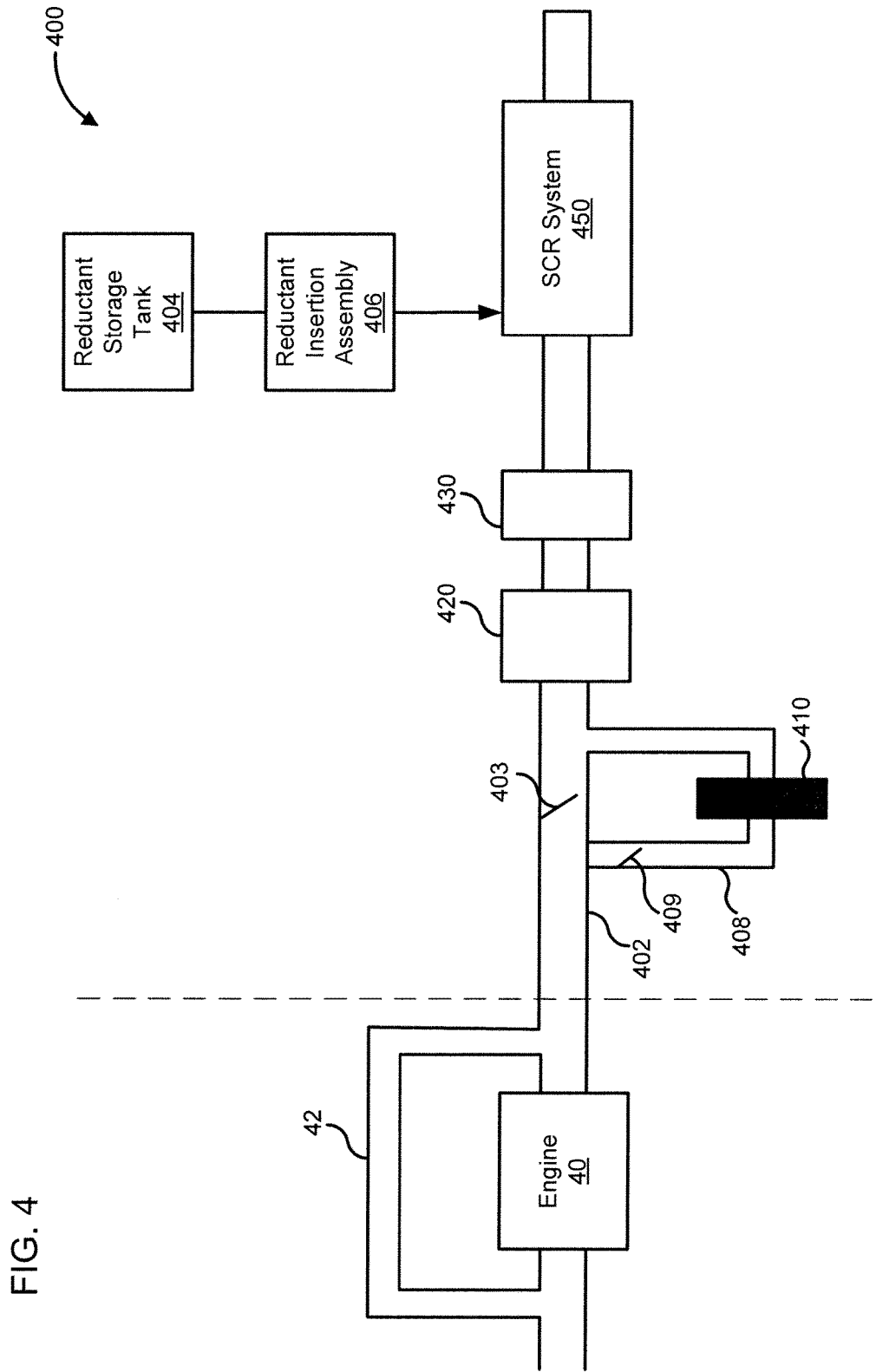
FIG. 4 is an illustration of another embodiment of an aftertreatment system.

FIG. 4 is an illustration of an aftertreatment system 400 including a bypass line according to an embodiment of the present disclosure. The aftertreatment system 400 is fluidly coupled to an engine 40, which may be substantially similar to the engine 10, 20, 30 and is therefore not described in detail herein. The aftertreatment system 400 is fluidly coupled to the engine 40 via an exhaust conduit 402.

An EGR line 42 may be fluidly coupled to the exhaust conduit 402 and configured to recirculate a portion of the exhaust gas to the engine 40, as described with respect to the EGR line 12 of FIG. 1.

The aftertreatment system 400 includes an SCR system 450. A reductant insertion assembly 406 may be operatively coupled to the SCR system 450 and configured to selectively insert a reductant into the SCR system 450 from a reductant storage tank 404. The reductant storage tank 404, the reductant insertion assembly 406, and the SCR system 450 may be substantially similar to the reductant storage tank 104, 204, 304, the reductant insertion assembly 106, 206, 306, and the SCR system 150, 250, 350 respectively, and are therefore not described in detail herein.

A turbocharger 420 is positioned downstream of the engine 40 and upstream of the SCR system 450. The turbocharger 420 may be substantially similar to the turbocharger 120, 220, 320, and is therefore not described in detail herein.

A second oxidation catalyst 430 is positioned downstream of the turbocharger 420. The second oxidation catalyst 430 may be substantially similar to the second oxidation catalyst 130 and is therefore not described in detail herein.

A bypass line 408 is fluidly coupled to the exhaust conduit 402 upstream of the turbocharger 420. A first oxidation catalyst 410 is positioned in the bypass line 408. The first oxidation catalyst may be substantially similar to the first oxidation catalyst 110, and is therefore not described in detail herein. The bypass line 408 is configured to receive a portion of the exhaust gas expelled by the engine 40 and deliver the received portion of the exhaust gas upstream of the turbocharger 420. In such embodiments, another portion of the exhaust gas may still flow through the exhaust conduit 402 towards the turbocharger 420.

In one or more embodiments, the bypass line 408 may be configured to selectively receive and communicate all of the exhaust gas to the turbocharger 420 during a low temperature operation of the engine 40 in which a temperature of the exhaust gas is less than a value at which efficient $NO_x$ conversion occurs (e.g., less than 200 degree Celsius). For example, a valve 403 may be positioned in the exhaust conduit 402. The valve 403 may be selectively closed during the low temperature operation of the engine 40 to allow all or substantially all of the exhaust gas to be communicated through the bypass line 408, the first oxidation catalyst 410 and towards the turbocharger 420.

The bypass line 408 may be configured to be selectively closed in response to an exhaust gas temperature rising to a level at which efficient $NO_x$ conversion occurs (e.g., the temperature exceeding a predetermined threshold, such as 200 degrees Celsius), to prevent the exhaust gas (or the second portion of the exhaust gas) from passing through the first oxidation catalyst 410, thereby protecting the first oxidation catalyst 410 from thermal aging. For example, a valve 409 may be positioned in the bypass line 408. The valve 409 may be selectively closed, such as when the exhaust gas temperature exceeds a predetermined threshold, to prevent the exhaust gas from flowing through the bypass line 408.

In one or more embodiments, a zone coated first oxidation catalyst may be positioned in the bypass line 408.

Figure 5:
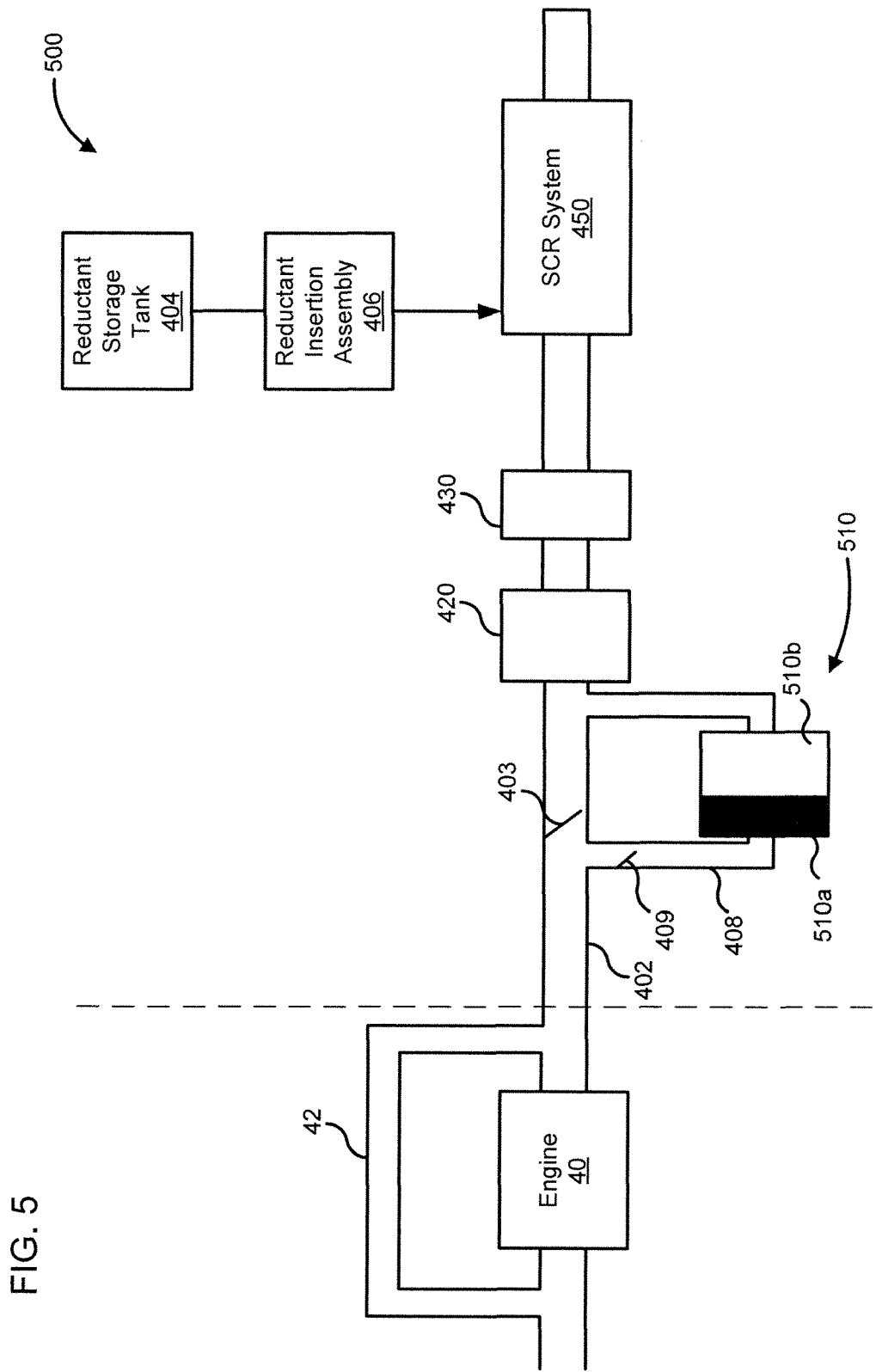
FIG. 5 is an illustration of another embodiment of an aftertreatment system.

FIG. 5 is an illustration of an aftertreatment system 500 including a zone coated oxidation catalyst in a bypass line. The aftertreatment system 500 is substantially similar to the aftertreatment system 400, a difference being that the aftertreatment system 500 includes a zone coated first oxidation catalyst 510 positioned in the bypass line 408. The first oxidation catalyst 510 includes a first oxidation catalyst first portion 510a configured to promote oxidation of HCs included in the exhaust gas. A first oxidation catalyst second portion 510b is positioned downstream of the first oxidation catalyst first portion 510a and configured to promote conversion of NO to $NO_2$, as described herein with respect the first oxidation catalyst 210.

In one or more embodiments, a zone coated second oxidation catalyst may be positioned downstream of the turbocharger 420.

Figure 6:
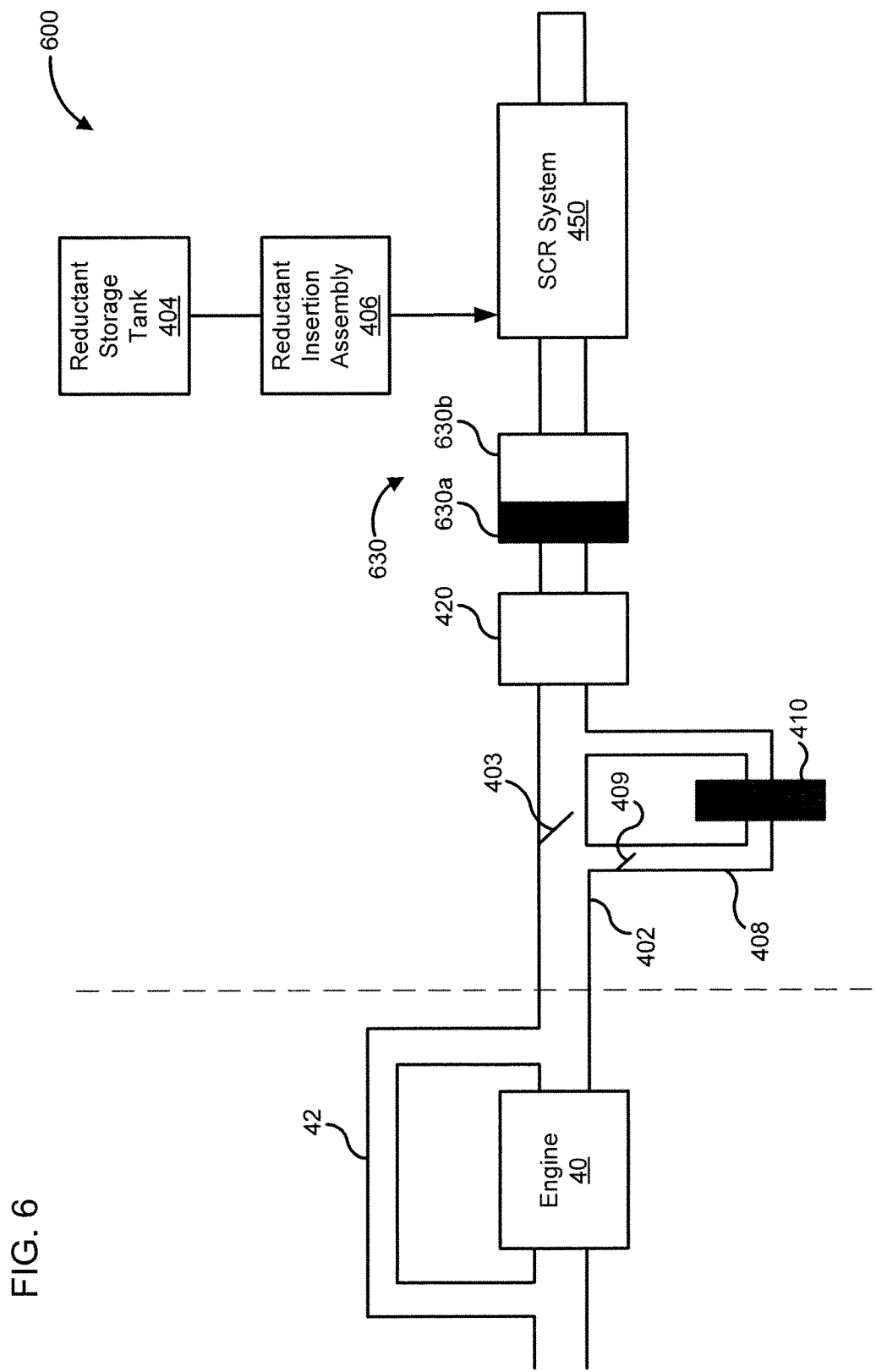
FIG. 6 is an illustration of another embodiment of an aftertreatment system.

FIG. 6 is an illustration of an aftertreatment system 600 including a zone coated oxidation catalyst downstream of a turbocharger. The aftertreatment system 600 is substantially similar to the aftertreatment system 400 of FIG. 4, a difference being that the aftertreatment system 600 includes a zone coated second oxidation catalyst 630 positioned downstream of the turbocharger 420. The second oxidation catalyst 630 includes a second oxidation catalyst first portion 630a configured to promote oxidation of HCs included in the exhaust gas. A second oxidation catalyst second portion 630b is positioned downstream of the second oxidation catalyst first portion 630a and is configured to promote conversion of NO to $NO_2$, as described herein with respect the second oxidation catalyst 130.

Figure 7:
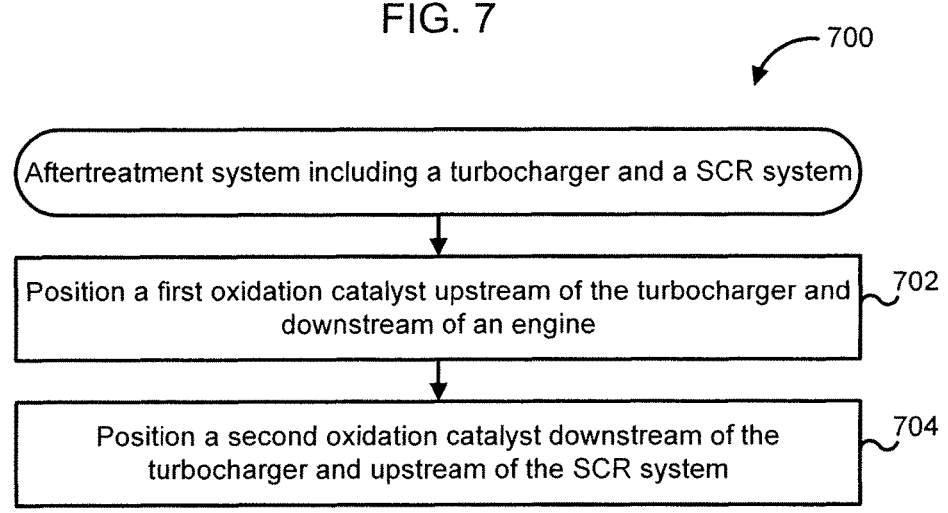
FIG. 7 is a flow diagram of an example method of increasing $NO_2$ fraction in an exhaust gas having a low exhaust gas temperature.

FIG. 7 is a flow diagram of an example of a method 700 for enhancing a $NO_x$ conversion efficiency of an SCR system (e.g., the SCR system 150, 250, 350, 450) at low temperatures (e.g., temperatures of less than 200 degrees Celsius) of an exhaust gas passing through an aftertreatment system (e.g., the aftertreatment system 100, 200, 300, 400, 500, 600) by increasing an $NO_2$ fraction of the exhaust gas upstream of the SCR catalyst. The aftertreatment system may also include a turbocharger (e.g., the turbocharger 120, 220, 320, 420) positioned upstream of the SCR system and downstream of an engine (e.g., the engine 10, 20, 30, 40) producing the exhaust gas communicated to the aftertreatment system.

The method 700 includes positioning a first oxidation catalyst upstream of the turbocharger and downstream of the engine at 702. For example, the first oxidation catalyst may be positioned in an exhaust conduit (e.g., the exhaust conduit 102, 202, 302, 402) upstream of the turbocharger. In one or more embodiments, the first oxidation catalyst may be positioned in a bypass line (e.g., the bypass line 408) fluidly coupled to the exhaust conduit (e.g., the exhaust conduit 402) upstream of the turbocharger.

The first oxidation catalyst includes a first oxidation catalyst formulation configured to promote decomposition of unburnt HCs included in the exhaust gas. For example, the first oxidation catalyst may include the first oxidation catalyst 110, 410. In one or more embodiments, the first oxidation catalyst (e.g., the first oxidation catalyst 210, 510) may include a zone coated oxidation catalyst.

A second oxidation catalyst is positioned downstream of the turbocharger and upstream of the SCR system at 704. The second oxidation catalyst may include a second oxidation catalyst formulation different from the first oxidation catalyst formulation configured to promote conversion of NO to $NO_2$. For example, the second oxidation catalyst may include the second oxidation catalyst 130, 430. In one or more embodiments, the second oxidation catalyst (e.g., the second oxidation catalyst 330, 630) may include a zone coated oxidation catalyst.

It should be understood that, although not illustrated in the figures, various embodiments include an electronic controller for controlling various aspects of the aftertreatment systems 100, 200, 300, 400, 500, 600 of FIGS. 1-6. In some embodiments, the electronic controller is an engine control module (ECM). In various embodiments, for example, any of the aftertreatment systems 400, 500, 600 may include a controller in operative communication with the valves 403, 409 so as to control the operation thereof in response to detected operating conditions.

The controller includes a processor and one or more memory devices. The processor may be implemented as any type of processor including one or more application specific integrated circuits (ASICs), one or more field programmable gate arrays (FPGAs), one or more digital signal processors (DSPs), a group of processing components, other suitable electronic processing components, or a combination thereof. The one or more memory devices may store data and/or computer code for facilitating the various processes described herein. Thus, the one or more memory devices may be communicably connected to the processor and provide computer code or instructions for executing the processes described in regard to the controller herein. Moreover, the one or more memory devices may be, or may include, tangible, non-transient volatile memory or non-volatile memory (e.g., NVRAM, RAM, ROM, Flash Memory, etc.). Accordingly, the one or more memory devices may include database components, object code components, script components, or any other type of information structure for supporting the various activities and information structures described herein.

The controller includes various circuits for completing the activities described herein. In one embodiment, the circuits of the controller may utilize the processor and/or memory to accomplish, perform, or otherwise implement various actions described herein with respect to each particular circuit. The processor and/or memory may be shared components across each circuit, or at least one of the circuits may include their own dedicated processing circuit having a processor and a memory device. In this latter embodiment, the circuit may be structured as an integrated circuit or an otherwise integrated processing component. In yet another embodiment, the activities and functionalities of circuits may be embodied in the memory, or combined in multiple circuits, or as a single circuit. It should be understood that the controller may include any number of circuits for completing the functions and activities described herein. For example, the activities of multiple circuits may be combined as a single circuit, as an additional circuit(s) with additional functionality, etc. Further, it should be understood that the controller may further control other activity beyond the scope of the present disclosure.

Certain operations of the controller described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to 10.1%, or less than or equal to 10.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to 0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
   a turbocharger;
   a first oxidation catalyst upstream of the turbocharger, the first oxidation catalyst comprising a first oxidation catalyst formulation; and
   a second oxidation catalyst downstream of the turbocharger, the second oxidation catalyst comprising a second oxidation catalyst formulation different than the first oxidation catalyst formulation, the second oxidation catalyst formulation configured to promote conversion of nitric oxide (NO) to nitrogen dioxide ($NO_2$).

2. The aftertreatment system of claim 1, wherein, in operation, at exhaust gas temperatures of less than 200 degrees Celsius, a ratio of $NO_2$ to nitrogen oxide ($NO_x$) gases in an exhaust gas after passing through the second oxidation catalyst is in a range between about 0.4 to about 0.6, and wherein the ratio allows a selective catalytic reduction system to attain a catalytic conversion efficiency of at least 90% at an exhaust gas temperature of less than 200 degrees Celsius.

3. The aftertreatment system of claim 1, wherein the first oxidation catalyst formulation is configured to promote oxidation of hydrocarbons included in an exhaust gas flowing through the aftertreatment system.

4. The aftertreatment system of claim 3, wherein each of the first oxidation catalyst and the second oxidation catalyst comprises a platinum group metal, and wherein the first oxidation catalyst has a higher loading of the platinum group metal than the second oxidation catalyst.

5. The aftertreatment system of claim 4, wherein the platinum group metal includes platinum and palladium, and wherein the first oxidation catalyst comprises a lower loading ratio of the platinum to the palladium relative to the second oxidation catalyst.

6. The aftertreatment system of claim 1, wherein the first oxidation catalyst comprises:
   a first oxidation catalyst first portion configured to promote oxidation of hydrocarbons included in the exhaust gas; and
   a first oxidation catalyst second portion positioned downstream of the first oxidation catalyst first portion, the first oxidation catalyst second portion configured to promote conversion of NO included in the exhaust gas to $NO_2$.

7. The aftertreatment system of claim 1, wherein the second oxidation catalyst comprises:
   a second oxidation catalyst first portion configured to promote oxidation of hydrocarbons included in the exhaust gas; and
   a second oxidation catalyst second portion positioned downstream of the second oxidation catalyst first portion, the second oxidation catalyst second portion configured to promote conversion of NO included in the exhaust gas to $NO_2$.

8. The aftertreatment system of claim 1, wherein the first oxidation catalyst is positioned downstream of an exhaust gas recirculation line, the exhaust gas recirculation line positioned downstream of the engine and configured to recirculate a first portion of an exhaust gas from downstream of the engine to upstream of the engine.

9. The aftertreatment system of claim 1, wherein the first oxidation catalyst is positioned downstream of the engine.

10. The aftertreatment system of claim 1, wherein the second catalyst is positioned upstream of a selective catalytic reduction system.

11. An aftertreatment system, comprising:
    a selective catalytic reduction system configured to decompose constituents of an exhaust gas produced by an engine;

a first oxidation catalyst upstream of a turbocharger, the first oxidation catalyst comprising a first oxidation catalyst formulation; and a second oxidation catalyst downstream of the turbocharger and upstream of the selective catalytic reduction system, the second oxidation catalyst comprising a second oxidation catalyst formulation different than the first oxidation catalyst formulation, the second oxidation catalyst formulation configured to promote conversion of nitric oxide (NO) included in the exhaust gas to nitrogen dioxide ($NO_2$).

12. The aftertreatment system of claim 11, wherein the first oxidation catalyst formulation is configured to promote oxidation of hydrocarbons included in the exhaust gas.

13. The aftertreatment system of claim 11, further comprising:

an exhaust conduit communicating the exhaust gas to the turbocharger from the engine; and a bypass line fluidly coupled to the exhaust conduit upstream of the turbocharger, the bypass line receiving at least a portion of the exhaust gas expelled by the engine and delivering at least the portion of the exhaust gas upstream of the turbocharger, wherein the first oxidation catalyst is positioned in the bypass line.

14. The aftertreatment system of claim 13, wherein the bypass line is selectively closed in response to an exhaust gas temperature exceeding a predetermined threshold, so as to prevent the second portion of the exhaust gas from passing through the first oxidation catalyst.

15. The aftertreatment system of claim 11, wherein the first oxidation catalyst is positioned downstream from the engine.

16. A method, comprising:

providing an exhaust aftertreatment system, comprising:

a first oxidation catalyst positioned upstream of a turbocharger, the first oxidation catalyst comprising a first oxidation catalyst formulation; and a second oxidation catalyst positioned downstream of the turbocharger, the second oxidation catalyst comprising a second oxidation catalyst formulation different than the first oxidation catalyst formulation, the second oxidation catalyst formulation configured to promote conversion of nitric oxide (NO) to nitrogen dioxide ($NO_2$); and flowing exhaust gas through the first oxidation catalyst and the second oxidation catalyst.

17. The method of claim 16, wherein the exhaust aftertreatment system further comprises:

an exhaust conduit communicating the exhaust gas to the turbocharger from an engine;

a bypass line fluidly coupled to the exhaust conduit upstream of the turbocharger, the bypass line receiving at least a portion of the exhaust gas expelled by the engine and delivering at least the portion of the exhaust gas upstream of the turbocharger, the first oxidation catalyst positioned in the bypass line; and a first valve positioned in the exhaust conduit in parallel with the first oxidation catalyst, the first valve controllably actuatable between a closed position and an open position.

18. The method of claim 17, further comprising controllably actuating the first valve to the closed position in response to a temperature of the exhaust gas being below a predetermined threshold so as to cause the exhaust gas to flow through the first oxidation catalyst positioned in the bypass line.

19. The method of claim 17, wherein the exhaust aftertreatment system further comprises a second valve positioned in the bypass line upstream of the first oxidation catalyst, the second valve controllably actuatable between a closed position and an open position.

20. The method of claim 19, further comprising controllably actuating the second valve to the closed position in response to the temperature of the exhaust gas being above the predetermined threshold so as to prevent the exhaust gas from flowing through the first oxidation catalyst positioned in the bypass line.

* * * * *